United States Patent
Kojima (10) Patent No.: US 7,144,117 B2
(45) Date of Patent: Dec. 5, 2006

(54) PROJECTION TYPE IMAGE DISPLAY APPARATUS

(75) Inventor: Akihiro Kojima, Tokyo (JP)

(73) Assignee: Sony Corporation (JP)

( * ) Notice: Subject to any disclaimer, the term of this patent is extended or adjusted under 35 U.S.C. 154(b) by 93 days.

(21) Appl. No.: 10/943,860

(22) Filed: Sep. 20, 2004

(65) Prior Publication Data
US 2005/0035943 A1   Feb. 17, 2005

(51) Int. Cl.
G03B 21/26 (2006.01)
G03B 21/28 (2006.01)
G03B 21/00 (2006.01)
G09G 5/00 (2006.01)

(52) U.S. Cl. .................. 353/37; 345/156; 353/50; 353/122

(58) Field of Classification Search .......... 353/42, 353/85–87, 121, 122, 70, 37, 50; 348/744, 348/739
See application file for complete search history.

(56) References Cited

U.S. PATENT DOCUMENTS

| | | | |
|---|---|---|---|
| 6,460,999 B1 * | 10/2002 | Suzuki | 353/79 |
| 6,575,581 B1 * | 6/2003 | Tsurushima | 353/121 |
| 6,910,778 B1 * | 6/2005 | Hamana et al. | 353/42 |
| 6,984,039 B1 * | 1/2006 | Agostinelli | 353/28 |
| 2004/0080404 A1 * | 4/2004 | White | 340/435 |
| 2005/0024704 A1 * | 2/2005 | Sakai | 359/212 |
| 2005/0225629 A1 * | 10/2005 | Kubota et al. | 348/51 |

FOREIGN PATENT DOCUMENTS

JP   03-065916   3/1991

* cited by examiner

*Primary Examiner*—Melissa Jan Koval
*Assistant Examiner*—Andrew Kong
(74) *Attorney, Agent, or Firm*—Rader, Fishman & Grauer PLLC; Ronald P. Kananen

(57) ABSTRACT

A projection type image display apparatus including a scanning mirror and a projection lens adapted to project an image on an image-displaying screen by scanning with a laser beam, and a detector adapted to detect the presence or absence of an intruding object between the projection means and the screen, wherein detection by the detector is conducted relative to a position preceding the laser beam in the scan direction of the laser beam.

17 Claims, 10 Drawing Sheets

PROJECTION TYPE IMAGE DISPLAY APPARATUS

BACKGROUND OF THE INVENTION

The present invention relates to a projection type image display apparatus for displaying images by using laser as a light source.

As an image display apparatus capable of large-screen display, there is known a projection type image display apparatus, i.e., so-called projector apparatus.

In the projection type image display apparatus, it is considered to display images by scanning with a laser beam using a laser light as a light source, in view of its merits such as easiness of modulation by a picture signal, good color reproduction performance, and capability of sufficiently securing brightness (see, for example, Japanese Patent Laid-open No. Hei 3-65916).

Meanwhile, since the laser light is emitted from a very small light emitting point and is a parallel light with a small divergence angle, viewing into the light causes the light to be condensed as a small point on the retina of the eye, and, when the laser power is high, the retina of the eye undergoes a burn.

Therefore, as to laser light using apparatuses, the international laser safety standards IEC60825 series and the related domestic standards of individual countries provide severe safety standards for the producers and users of laser apparatuses. For example, IEC60825-1 provides class classifications from Class 1 to Class 4 according to the magnitude of laser power, and, for each of the classes, provides a guide to be observed by the producers and users.

In recent years, for example, laser light shows using sharp-colored laser beams have come to be performed in large events and the like.

In the cases of the laser light shows, also, the producers and users of the laser apparatuses must deal with the laser light on the basis of the above-mentioned safety standards. For example, in order to perform a laser light show with brighter laser beams, a manager skilled in the art of laser apparatuses must be present.

On the other hand, in the cases of image display apparatuses in which a screen is scanned with laser beams, the laser light diffused and reflected upon once impinging on the screen is diffused in all directions, so that it is confirmed that even a laser with considerable intensity (laser class classification 3B or below) is safe.

However, if one should erroneously and directly look at the laser beam before irradiation of a screen therewith, there is the possibility that the retina of the eye might undergo a burn when the light quantity of the laser beam is large.

As a method for solving the above problem, the following methods may be contemplated.

A first method is a method in which the laser beam is operated in such a range that even the direct incidence of the laser beam on the eye is safe. Specifically, though differing according to laser beam exposure conditions, the laser beam is operated in the range of Laser Class 1 or 2.

A second method is a method in which a shield is provided so that people cannot enter a laser irradiation space, thereby making it impossible for the audience from directly peeping into the laser beam.

A third method is a method in which intrusion of a person into the laser irradiation space is supervised, so as to make it impossible for the audience from directly peeping into the laser beam, and, if there is some intruding object into the irradiation space, the output of the laser light is lowered to such an extent as to be non-harmful to human beings.

In the first method, however, the laser power is restricted to a low level, so that it is impossible to display images brightly. Therefore, it is impossible to sufficiently display the merits of the use of laser beams.

Besides, in the second method, it is highly possible that the shield may obstruct the view of the audience.

In view of the above, the third method is considered to be the most desirable, with minimum influence on the quality of the images displayed.

As a configuration realizing the third method, there is considered a configuration which includes an image display region space scanned with a laser beam for image display and in which the space including a certain extent of peripheral region space is supervised, and, in consideration of the intruding speed of a person, the output of the laser beam is lowered to such a degree as not to be harmful to the person, before the person reaches to the image display region.

Where this configuration is adopted, however, there are the following demerits.

Firstly, even where the person stays only in the peripheral region space and he does not enter the image display region space scanned with the laser beam, the luminance of image display would be lowered.

Secondly, in a configuration in which the supervision is conducted by use of only one sensor, the luminance of the image display as a whole is lowered, in whatever region of a part of the supervised region the abnormality is sensed (the intruding object is sensed).

For example, when the current international laser safety standard (IEC60825-1) is interpreted on the most safe side, a finger of a child must be detected, and the luminance of the image display as a whole would be lowered even where an insect comparable to the child's finger in size (diameter: about 12 mm) has flown and intruded.

In view of this, it may be considered to adopt a configuration in which the supervision is conducted by a plurality of sensors, or a configuration in which a high level of image processing is conducted to determine the intrusion position of the intruding object, and the luminance of image display is lowered only at the part near the intrusion position. Where such a configuration is adopted, the equipment cost is increased accordingly.

Thirdly, the broad region including the range from the projection lens to the image display screen which is a two-dimensional plain surface must always be monitored, so that it takes a longer time until a detection signal is outputted, as compared with the case where the monitoring is conducted one-dimensionally or at a point or points.

SUMMARY OF THE INVENTION

In order to solve the above problems, the present invention provides a projection type image display apparatus with which it is possible to achieve a speedy and easy detection in the presence of an intruding object in the projection space for image display, and to restrain the influences of the intruding object on the image display.

In accordance with the present invention, there is provided a projection type image display apparatus including: projection means for projecting an image on an image-displaying screen by scanning with a laser beam, and detection means for detecting the presence or absence of an intruding object between the projection means and the screen, wherein detection by the detection means is conducted relative to a position preceding the laser beam in the scan direction of the laser beam.

According to the constitution of the projection type image display apparatus of the present invention, the projection means for projecting images on the screen for displaying the images by scanning with the laser beam and the detection means for detecting the presence or absence of an intruding object between the projection means and the screen are provided, and detection by the detection means is conducted relative to a position preceding the laser beam in the scan direction of the laser beam, whereby the presence or absence of the intruding object can be precedingly detected before the intruding object is irradiated with the laser beam.

According to the present invention as above, when an intruding object is present in the projection space of the laser beam for image display, the intruding object can be detected speedily and easily, before the intruding object is irradiated with the laser beam.

For example, when the intruding object is present, the output of the image display laser beam is lowered. Thus, a laser beam at such a level as not to harm human beings can be obtained. Therefore, sufficient safety is ensured, and a projection type image display apparatus safe to the eyes can be constructed. Further, it will be easy to lower the output of the image display laser beam only in the vicinity of the area where the intruding object intruded into the irradiation space of the image display laser beam is projected on the screen. Therefore, the influences of the intruding object on the image display can be restrained without dissatisfying the audience.

Furthermore, the projection means such as a scanning mirror and a projection lens can be used in common for the detection means and the laser beam for image display. Where the projection mean is used in common in this manner, the setting procedure in the case where the distance between the projection type image display apparatus and the screen has been changed can be simplified, and the cost of the apparatus can be reduced.

BRIEF DESCRIPTION OF THE DRAWINGS

The above and other objects, features and advantages of the present invention will become apparent from the following description and appended claims, taken in conjunction with the accompanying drawings, in which:

DETAILED DESCRIPTION OF THE PREFERRED EMBODIMENTS

First, prior to the description of specific embodiments of the present invention, the concept of the present invention will be described.

The present invention resides in a projection type image display apparatus for displaying images by projection on a screen through scanning with a laser beam, wherein a scheduled path of irradiation with a laser beam for image display is precedingly monitored by some detection method.

Figure 8:
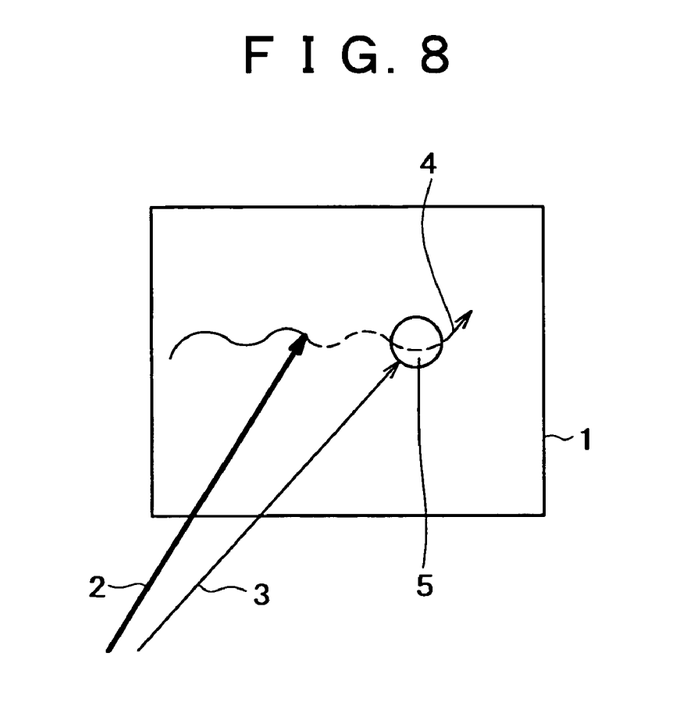
FIG. 8 is a diagram for illustrating the concept of the present invention.

Specifically, as for example shown in FIG. 8, in a scanning path 4 of an image display laser beam 2 with which a screen 1 is irradiated, at the scheduled path (broken-line portion in the figure) to be irradiated with the laser beam, i.e., for example at a detection position 5, the presence or absence of an intruding object is precedingly detected. The method for detecting the presence or absence of the intruding object is not particularly limited; for example, a detection beam (e.g., an infrared laser beam at such an output level as to be safe to the eye) 3 shown in FIG. 8 is radiated to the detection position 5.

Such an operation ensures that the presence or absence of the intruding object can be detected before the irradiation with the image display laser beam 2, so that where the intruding object is present, it is possible to lower the output of the image display laser beam 2 to such a level as not to be harmful to human beings for example.

Since the region for lowering the laser output is reduced as compared with the case where a region space including a peripheral region surrounding the image display region is monitored, it is possible to reduce the region where the images become dark.

Incidentally, the amount by which the detection position 5 precedes the irradiation position of the image display laser beam 2 is so set as to secure a time for controlling the output intensity of the image display laser beam 2 according to the detected information.

Next, a specific embodiment of the present invention will be described.

Figure 1A:
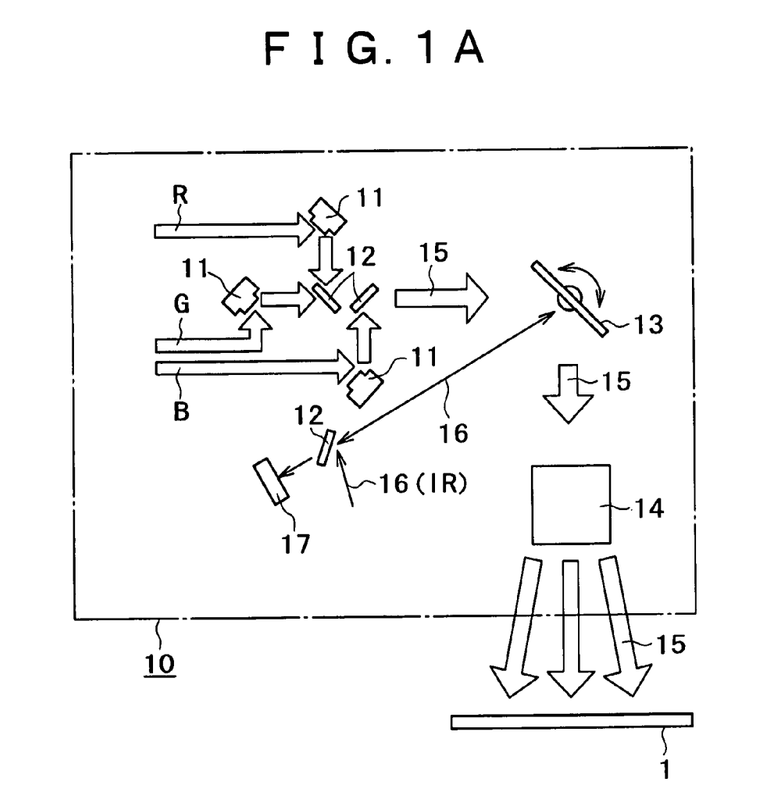
FIGS. 1A to 1C are schematic diagrams showing the configuration of a projection type image display apparatus according to one embodiment of the present invention.
Figure 1B:
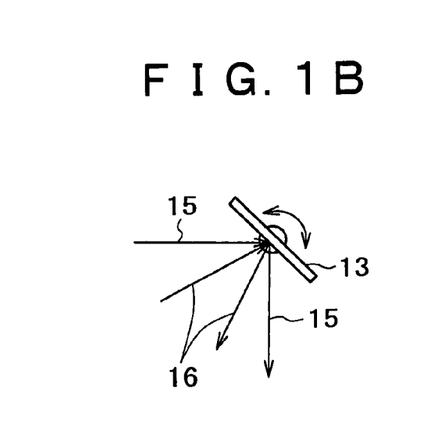
Figure 1C:
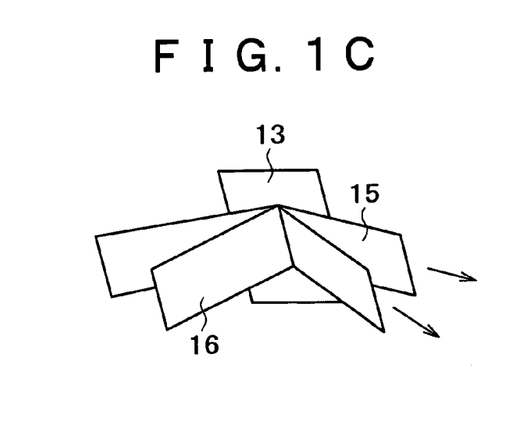

First, a general configuration of the projection type image display apparatus according to one embodiment of the present invention is shown in FIGS. 1A to 1C, in which FIG. 1A is a schematic diagram of the projection type image display apparatus as a whole, FIG. 1B is an enlarged plan view of an essential part, and FIG. 1C is an enlarged perspective view of an essential part.

The projection type image display apparatus 10 uses red (R), green (G), and blue (B) laser beams from laser beam sources (not shown), unites the laser beams R, G and B with each other to produce an image display laser beam 15, and scanningly irradiates the screen 1 with the image display laser beam 15, to display an image on the screen 1.

In addition, the projection type image display apparatus 10 includes GLV (Grating Light Valve) devices 11 for modulating the color laser beams R, G, and B from the laser beam source into one-dimensionally elongated laser beams, half-mirrors 12 for uniting the laser beams by changing optical paths, a scanning mirror 13 for scanning with the united laser beam 15, and a projection lens 14 for enlargingly radiating the laser beam 15.

The laser beams R, G, and B, upon irradiation of the GLV devices 11 therewith, are modulated into elongate laser beams extended in a one-dimensional direction, for example, in a direction corresponding to the vertical direction of the screen surface (image display region) of the screen 1, and the elongate laser beams are united with each other through the half-mirrors 12. Then, scanning with the united laser beam is conducted in the horizontal direction (the direction substantially orthogonal to the longitudinal direction of the laser beam) of the screen surface (image display region) of the screen 1.

As a result, a color image is displayed on the screen surface of the screen 1.

The projection type image display apparatus 10 in this embodiment includes the detection means for precedingly detecting an intruding object, in addition to the configuration for projecting the image display laser beam 15 onto the screen 1.

Specifically, the projection type image display apparatus 10 includes an infrared laser beam source (not shown), a half-mirror 12 for changing the optical path of the infrared laser beam 16 (IR) coming from the beam source, a detector 17 for receiving and detecting a return beam returning after the reflection of the infrared laser beam 16, and means (not shown) for measuring a pulse phase difference between the return beam received and detected by the detector 17 and an emitted beam and for calculating the reflection distance.

Incidentally, the infrared laser beam source and an optical system are so configured that the screen 1 is irradiated with the infrared laser beam 16 in an elongate beam so as to correspond to the image display laser beam 15 modulated to be elongate by the GLV devices 11.

Besides, though not shown, control means is also provided for controlling the outputs of the R, G, and B laser light sources, for the purpose of controlling the output of the image display laser beam 15.

Furthermore, in order that the infrared laser beam 16 is made to irradiate the screen surface of the screen 1 prior to the image display laser beam 15, the laser beams are different in the angle of incidence on the scanning mirror 13, as shown in FIGS. 1B and 1C. The scanning mirror 13 is composed of a mirror surface turnable about an axis, and, by the turning of the mirror surface, scanning with the image display laser beam 15 and the infrared laser beam 16 is conducted.

Incidentally, the reflection positions on the reflective surface of the scanning mirror 13 are the same, and each of the laser beams 15 and 16 is incident on the reflective surface so as to be reflected with an axis as a center.

Figure 2A:
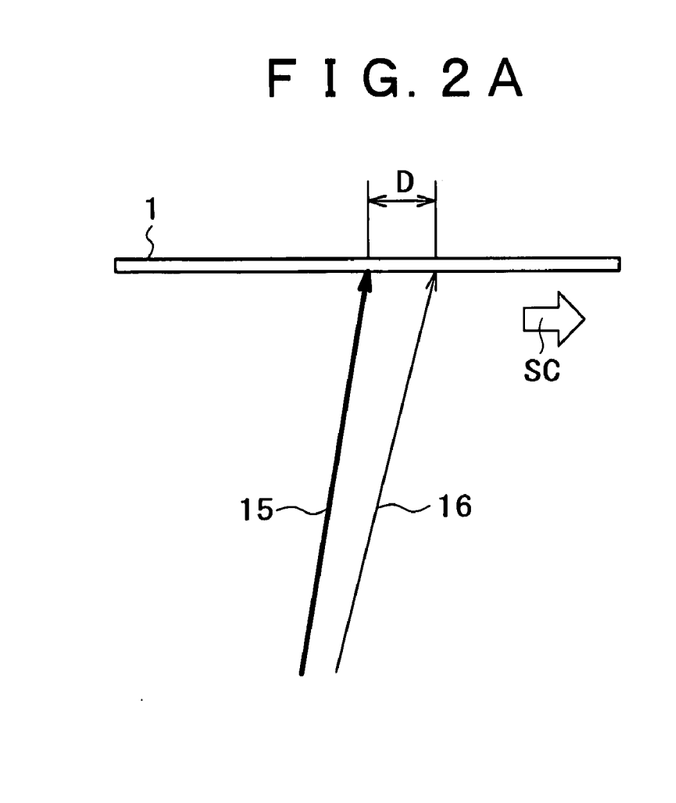
FIGS. 2A and 2B are diagrams showing the condition near the screen in the projection type image display apparatus of FIG. 1.
Figure 2B:
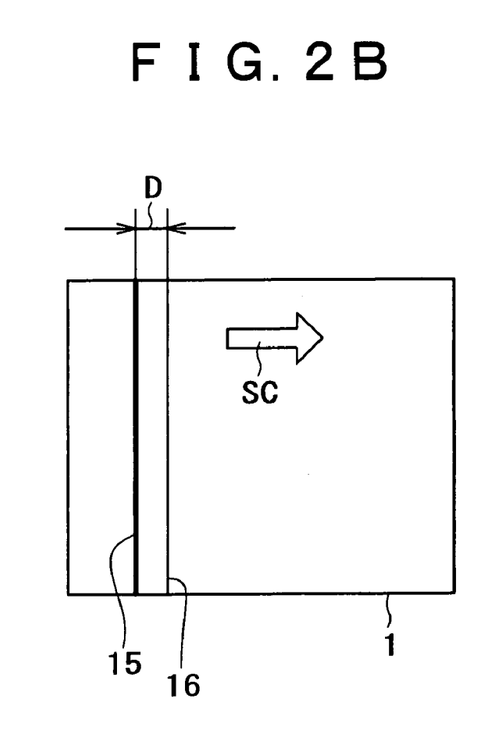

In addition, the condition near the screen 1 in the projection type image display apparatus 10 in this embodiment is shown in FIGS. 2A and 2B. FIG. 2A shows a plan view of the screen 1 as viewed from above, and FIG. 2B is a plan view of the screen 1 as viewed from the side of the projection type image display apparatus 10.

As has been described above, the laser beams 15 and 16 are different in the angle of incidence on the scanning mirror 13, whereby as shown in FIGS. 2A and 2B, the infrared laser beam (distance measuring laser beam) 16 precedes the image display laser beam 15 by a distance D in the scan direction SC.

The distance D may be, for example, equivalent to 10 to 20 pixels.

In the above-described configuration, the infrared laser beam 16 from the infrared laser beam source is reflected by the half-mirror 12, is incident on the scanning mirror 13, is reflected by the scanning mirror 13, and is radiated toward the side of the screen 1, precedently to the image display laser beam 15.

The infrared laser beam 16 thus radiated is reflected by the screen 1 or by an intruding object present in the space in front of the screen 1.

The thus reflected return beam is again reflected by the scanning mirror 13, and is transmitted through the half-mirror 12, to be incident on the detector 17.

Then, by measuring the pulse phase difference between the return beam received and detected by the detector 17 and the emitted beam emitted from the infrared laser beam source, it is possible to calculate the reflection distance of the infrared laser beam 16.

In other words, the infrared laser beam 16 functions also as the distance measuring laser beam, and it can be determined, from the calculated reflection distance and the direction in which the screen 1 is irradiated, whether the laser beam 16 has been reflected by the screen 1 or by the intruding object.

Where it is found that the laser beam 15 has been reflected by the intruding object as a result of the determination, the outputs of the R, G, and B laser beam sources are lowered by the control means so that the output of the image display laser beam 15 is lowered while the intruding object is irradiated with the image display laser beam 15.

Then, the detection by the infrared laser beam 16 is continued, and when the infrared laser beam 16 has come to be reflected by the screen 1, it is determined that the laser beam 16 has passed by the intruding object; then, the outputs of the R, G, and B laser beam sources are raised so that the output of the image display laser beam 15 is returned to its original value after the laser beam 15 has passed by the intruding object.

This ensures that the output of the image display laser beam 15 is lowered, to obtain such a laser beam as not to harm a human being, during the period (e.g., several hundreds of microseconds) until the image display laser beam 15 passes by the intruding object.

According to the projection type image display apparatus 10 in this embodiment as above, the screen 1 is irradiated with the infrared laser beam 16 (distance measuring laser beam) precedingly to the image display laser beam 15, and the return beam formed by reflection of the distance measuring laser beam is received and detected by the detector 17. Therefore, it is possible to measure the reflection distance of the distance measuring laser beam 16 and to determine whether an intruding object is present or absent at that position, before irradiation with the image display laser beam 15.

Where it is found that an intruding object is present as a result of the determination, the outputs of the R, G, and B laser beam sources are lowered by the control means so as to lower the output of the image display laser beam 15, whereby such a laser beam as not to harm a human being can be obtained.

Therefore, a laser scanning image display apparatus safe to the eyes can be built up.

By lowering the output of the image display laser beam 15 during the period until the image display laser beam 15 passes by the intruding object, a normal bright image is displayed, exclusive of the region of a tiny part corresponding to the intruding object. In other words, it is easy to lower the output intensity of the image display laser beam 15 only in the vicinity of the area where the intruding object is projected on the screen 1.

Therefore, the image can be seen in the same manner as a projection of a film movie, so that safety can be secured without dissatisfying the audience.

Furthermore, since the configuration, such as the reflector 13 and a projection lens 14, for scanningly irradiating the screen 1 with the distance measuring laser beam 16 is used in common for the image display laser beam 15, it is possible to simplify the setting procedure upon a change in the distance from the projection lens 14 to the screen 1, and to reduce the cost.

Figure 3A:
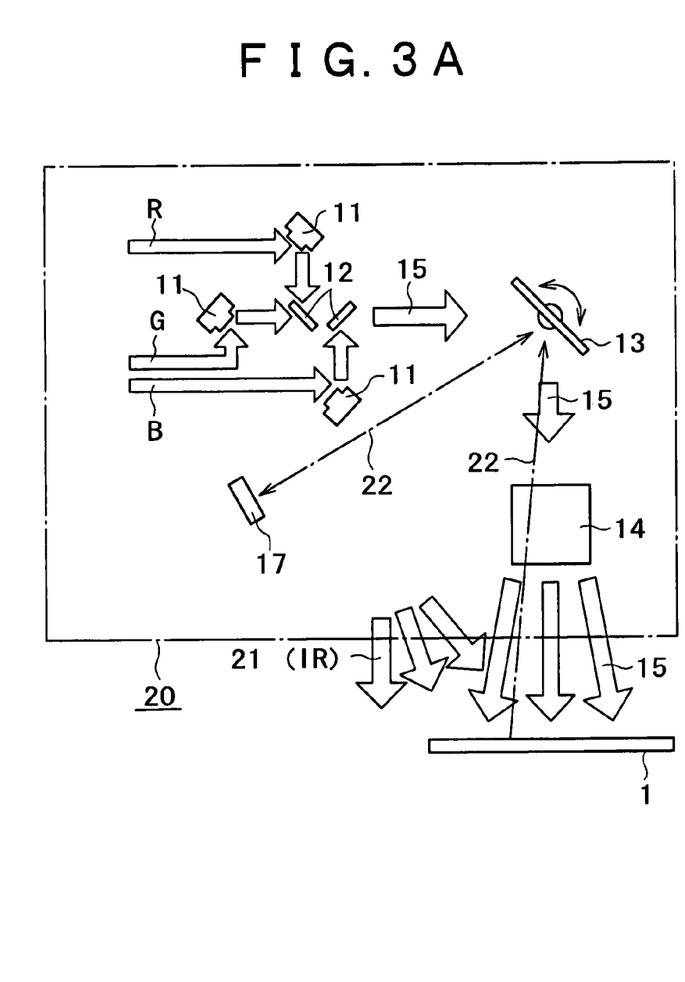
FIGS. 3A to 3C are schematic diagrams showing the configuration of a projection type image display apparatus according to another embodiment of the present invention.
Figure 3B:
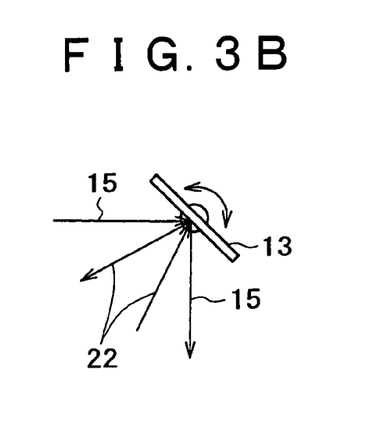
Figure 3C:
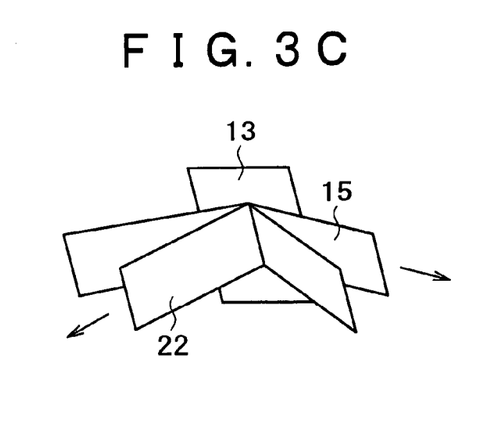

Next, the general configuration of a projection type image display apparatus according to another embodiment of the present invention is shown in FIGS. 3A to 3C, in which FIG. 3A is a schematic diagram of the projection type image display apparatus as a whole, FIG. 3B is an enlarged plan view of an essential part, and FIG. 3C is an enlarged perspective view of an essential part.

The projection type image display apparatus 20 is the same as the projection type image display apparatus 10 in the previous embodiment, as to the configuration for irradiating the screen 1 with the image display laser beam 15. On the other hand, the configuration of the detection means for detecting an intruding object in the projection type image display apparatus 20 is different from that in the projection type image display apparatus 10 in the previous embodiment.

Specifically, the projection type image display apparatus 20 includes an infrared ray source (e.g., an infrared projector, infrared ray-generating light-emitting diode, etc.) which is not shown, and a detector 17 for receiving and detecting the infrared rays, the infrared rays 21 are projected from the infrared ray source directly to the screen 1 (without passing through a projection lens 14), reflected beam 22 formed by reflection of the infrared rays 21 pass through the projection lens 14 and a scanning mirror 13, and are received and detected by the detector 17 disposed at such a position that the focus is located on the screen 1. The whole part of the screen 1 is irradiated with the infrared rays.

In this case, as the detector 17, there may be used, for example, a one-dimensional CCD image pickup device in which image pickup pixels are arranged in the direction of extension of a GLV device 11, configured to detect the infrared rays IR.

As shown in FIGS. 3B and 3C, the infrared rays constituting the reflected beam 22 are incident on the reflector in the direction reverse to the direction of the distance measuring laser beam 16 in FIGS. 1B and 1C.

The reflected beam 22 and the image display laser beam 15 are opposite in direction, are reflected at the axial center of the mirror surface of the scanning mirror 13, and are different in incidence angle and reflection angle.

Figure 4A:
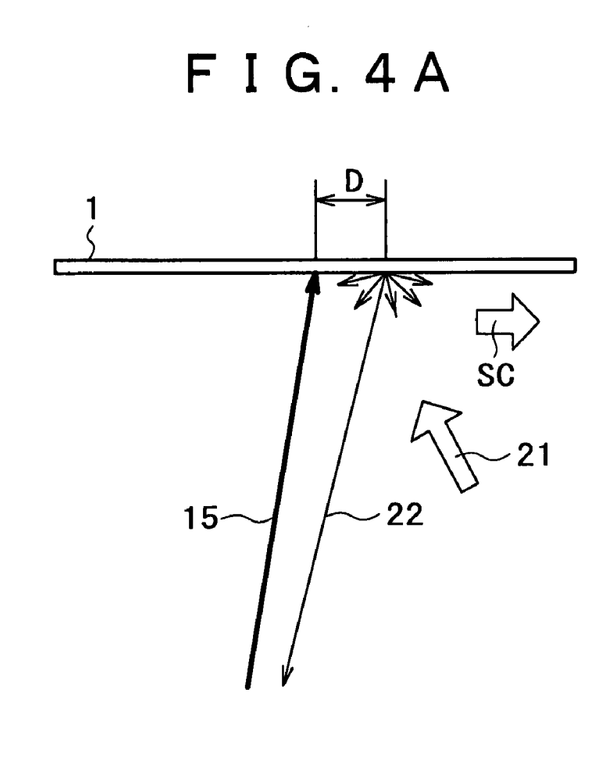
FIGS. 4A and 4B are diagrams showing the condition near the screen in the projection type image display apparatus of FIG. 3.
Figure 4B:
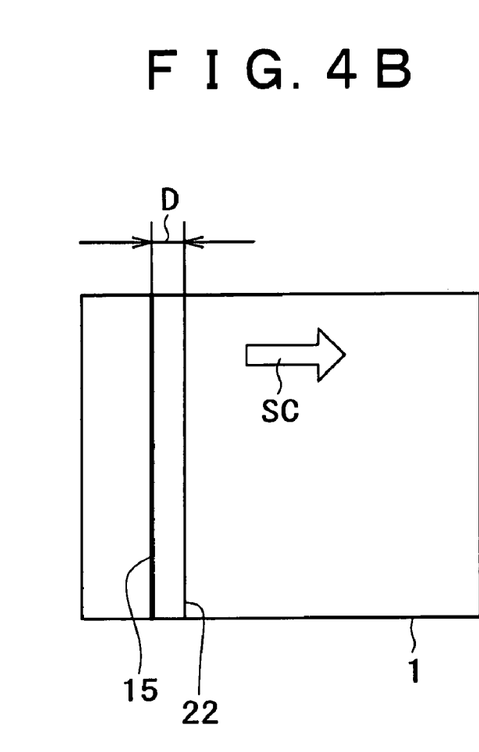

In addition, the condition near the screen 1 in the projection type image display apparatus 20 in this embodiment is shown in FIGS. 4A and 4B, in which FIG. 4A is a plan view of the screen 1 as viewed from above, and FIG. 4B is a plan view of the screen 1 as viewed from the side of the projection type image display apparatus 20.

As shown in FIG. 4A, infrared rays 21 from an infrared ray source are reflected by the screen 1, and a part thereof constitutes a reflected beam 22, which is incident on the side of the projection type image display apparatus 20. Incidentally, FIG. 4B is the same as FIG. 2B.

The other components are the same as in the projection type image display apparatus 10 according to the previous embodiment, so that a duplicated description thereof is omitted.

Such a configuration ensures that when an intruding object is present between the projection type image display apparatus 20 and the screen 1, the reflected beam 22 is blocked and will not reach the detector 17.

Therefore, by detecting the presence or absence of the reflected beam 22 by the detector 17, it is possible to detect the presence or absence of the intruding object.

Particularly when the detector 17 is constituted of a one-dimensional CCD image pickup device, it is possible to detect what part of the line-form reflected beam 22 shown in FIG. 4B is being blocked by the intruding object, so that the region where the output of the laser beam source is lowered by the control means can be restricted to only the part blocked by the intruding object.

Further, in this embodiment, the infrared rays 21 from the infrared ray source may be dynamically radiated to the detection position, or may be radiated to the whole part of the screen surface of the screen 1.

Incidentally, an infrared sensing camera with an image pickup device incorporated therein may be used in place of the detector 17. In this case, the camera is adjusted to locate the focus on the screen 1.

According to the projection type image display apparatus 20 in this embodiment as above, the reflected beam (infrared rays) 22 reflected at the detection position precedent to the image display laser beam 15 is received and detected by the detector 17, so that the presence or absence of an intruding object at that position can be determined before irradiation with the image display laser beam 15.

In addition, where it is found that the intruding object is present as a result of the determination, the outputs of R, G, and B laser beam sources are lowered by the control means so as to lower the output of the image display laser beam 15, whereby a laser beam at such a level as not to harm human beings can be obtained.

Therefore, a laser scanning image display apparatus safe to the eyes can be constructed.

By lowering the output of the image display laser beam 15 during the period until the image display laser beam 15 passes by the intruding object, an ordinary bright image is displayed, exclusive of the region of a tiny part corresponding to the intruding object. Namely, it is easy to lower the output intensity of the image display laser beam only in the vicinity of the area where the intruding object is projected on the screen.

Therefore, the screen can be looked at in the same manner as a projection of a film movie, so that safety can be secured without dissatisfying the audience.

Figure 5A:
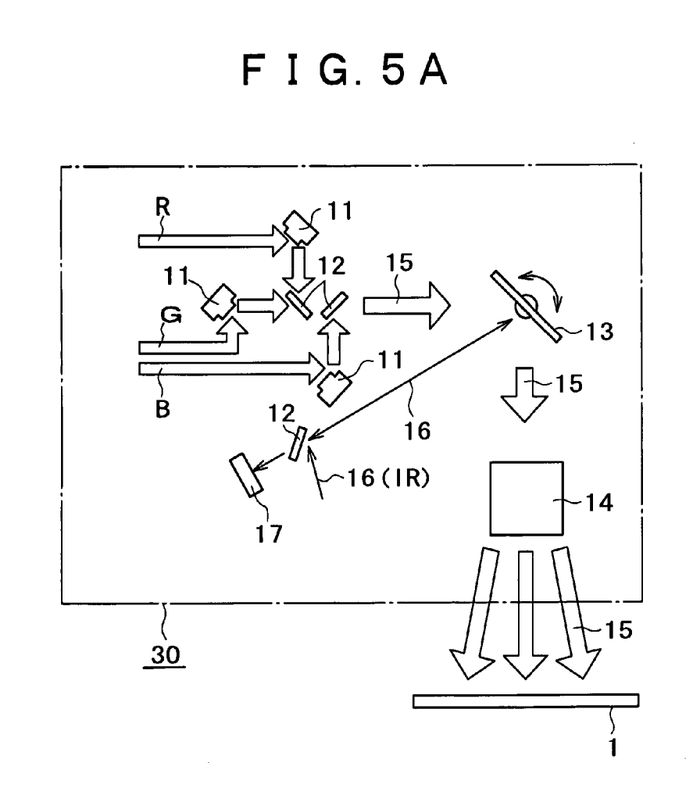
FIGS. 5A to 5C are schematic diagrams showing the configuration of a projection type image display apparatus according to a further embodiment of the present invention.
Figure 5B:
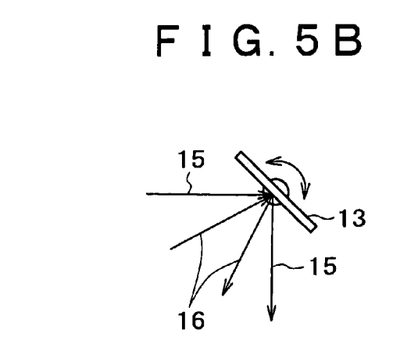
Figure 5C:
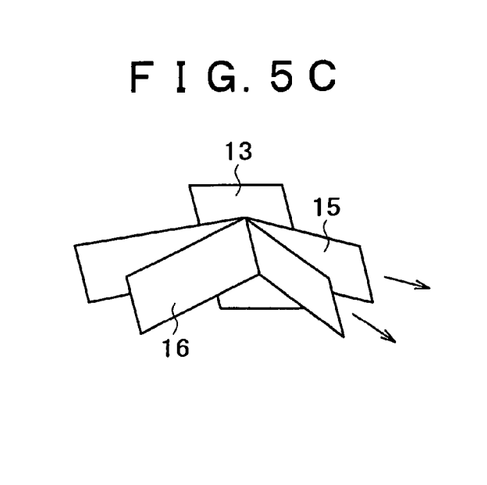

Next, a general configuration of a projection type image display apparatus according to a further embodiment of the present invention is shown in FIGS. 5A to 5C, in which FIG. 5A is a schematic diagram of the projection type image display apparatus as a whole, FIG. 5B is an enlarged plan view of an essential part, and FIG. 5C is an enlarged perspective view of an essential part.

The projection type image display apparatus 30 is the same as the projection type image display apparatus 10 in the previous embodiment, as to the configuration for irradiating a screen 1 with an image display laser beam 15.

On the other hand, the configuration of detection means for detecting an intruding object is roughly the same as that in the projection type image display apparatus 10 in the previous embodiment, but the range of irradiation of the screen 1 is different.

Specifically, as shown in FIG. 5C, the width of a distance measuring laser beam 16 is smaller than the width of the image display laser beam 15.

Figure 6A:
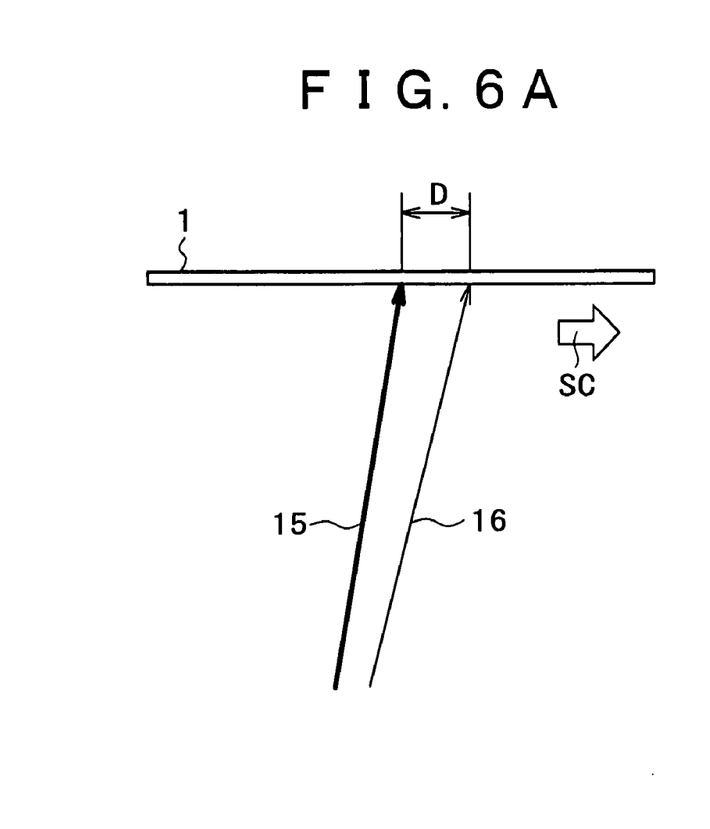
FIGS. 6A and 6B are diagrams showing the condition near the screen in the projection type image display apparatus of FIG. 5.
Figure 6B:
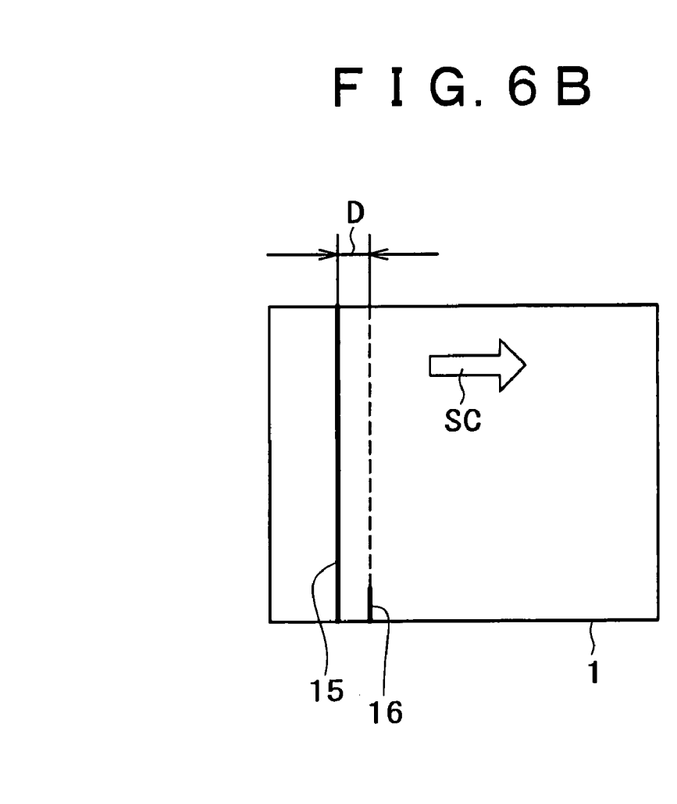

The condition near the screen 1 in the projection type image display apparatus 30 in this embodiment is shown in FIGS. 6A and 6B, in which FIG. 6A is a plan view of the screen 1 as viewed from above, and FIG. 6B is a plan view of the screen 1 as viewed from the side of the projection type image display apparatus 30.

As shown in FIG. 6B, the distance measuring laser beam 16 is radiated only to the region of a part on the lower side of the screen 1. Incidentally, FIG. 6A is the same as FIG. 2A.

The other components are the same as in the projection type image display apparatus 10 in the previous embodiment, so that a duplicate description thereof is omitted.

Such a configuration as above ensures that the range of the detection region of the detection means is reduced to the region of a part of the image display region, so that, for example, the calculation in performing the determination can be conducted in a shorter time, and the output of the image display laser beam 15 can be reduced swiftly.

In this case, intrusion from a lateral direction or from above cannot be detected, so that it is desirable to dispose the screen at a certain degree of height from the floor surface.

Incidentally, while the detection position is in a small width portion in FIGS. 5C and 6B, it is also possible to set one pixel at the lower end of the screen 1 to be the detection position.

According to the projection type image display apparatus 30 in this embodiment as above, the screen 1 is irradiated with an infrared laser beam (distance measuring laser beam) 16 precedently to the image display laser beam 15, and the return beam formed by reflection of the distance measuring laser beam is received and detected by the detector 17, so that it is possible to measure the reflection distance of the distance measuring laser beam 16 and to determine whether an intruding object is present or absent at that position, before irradiation with the image display laser beam 15.

Besides, where it is found that the intruding object is present as a result of the determination, by lowering the outputs of R, G, and B laser beam sources by the control means so that the output of the image display laser beam 15 is lowered, a laser beam at such a level as not to harm human beings can be obtained.

Therefore, a laser scanning image display apparatus safe to the eyes can be constructed.

By lowering the output of the image display laser beam 15 during the period until the image display laser beam 15 passes by the intruding object, an ordinary bright image is displayed, exclusive of the region of a tiny part corresponding to the intruding object. Namely, it is easy to lower the output intensity of the image display laser beam only in the vicinity of the area where the intruding object is projected on the screen.

Therefore, the screen can be looked at in the same manner as a projection of a film movie, so that safety can be secured without dissatisfying the audience.

Furthermore, the configuration, such as a reflector 13 and a projection lens 14, for scanningly irradiating the screen 1 with the distance measuring laser beam 16 is used in common for the image display laser beam 15, so that it is possible to simplify the setting procedure upon a change in the distance from the projection lens 14 to the screen 1, and to reduce the cost.

Besides, as yet another embodiment of the present invention, the configuration of the projection type image display apparatus 30 shown in FIGS. 5 and 6 may be changed, and the irradiation position of the distance measuring laser beam 16 may be set on the lower side of the image display region of the screen 1.

Figure 7:
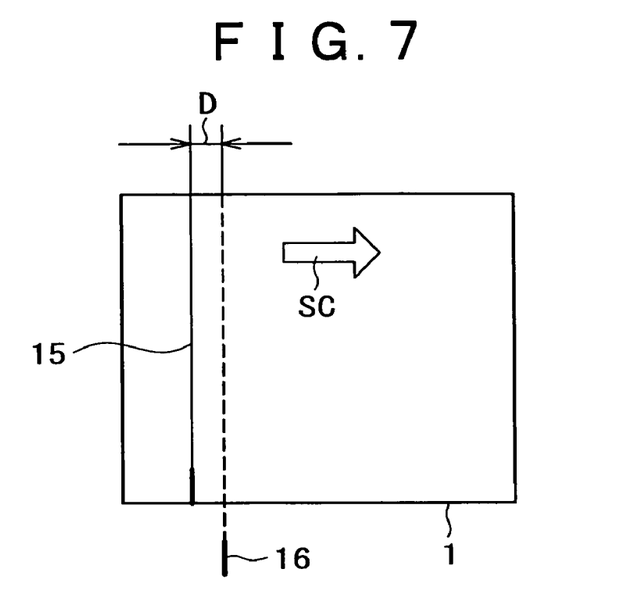
FIG. 7 is a diagram showing the condition near the screen in a projection type image display apparatus according to yet another embodiment of the present invention.

The condition near the screen 1 thus configured is shown in FIG. 7. As shown in FIG. 7, irradiation with the distance measuring laser beam 16 is conducted at a position which precedes in the scan direction SC relative to the irradiation position of the image display laser beam 15 and which is on the lower side of the image display region of the screen 1.

In order to perform such irradiation, it suffices that the mirror surface of the scanning mirror is broadened, and the distance measuring laser beam 16 is reflected in an area not overlapping the reflection position of the image display laser beam 15 at the axial center of the mirror surface.

Such a configuration as above ensures that where, for example, some modification (e.g., insertion of a diffuser for reducing speckles) is conducted between the scanning mirror and the screen 1 relative to the image display laser beam 15, it is possible to prevent the modification from influencing the distance measuring laser beam 16.

Incidentally, the configuration using a one-dimensional CCD image pickup device as the detector 17 as described in the above description of the projection type image display apparatus 20 of FIG. 3 is applicable similarly to the projection type image display apparatuses 10 and 30 in other embodiments. In addition, the one-dimensional CCD image pickup device is not limitative; the same effects can be obtained by use of a one-dimensional image pickup device based on another image pickup device such as a CMOS type image pickup device.

By use of the one-dimensional image pickup device or the like, what part of the detection position in the vertical direction can be detected easily and swiftly while utilizing the output of the image pickup device as it is.

While the case of horizontal scanning in which the scan direction SC is set in a horizontal direction of the screen 1 has been described in each of the above embodiments, the scanning system and the scan direction in the present invention are not particularly limited, and other configurations are also possible.

Here, a difference due to the scanning system will be described referring to FIG. 9.

The period of time taken for information processing as to the detection of an intruding object depends on the processing speed of a detection circuit thereof, and is expected to be shortened attendantly on the progress of the semiconductor technology from now on; at present, the information processing takes about 100 μsec.

Then, here, the difference due to the scanning system is comparatively investigated in the configuration in which the detection position precedes the image display laser beam by 100 μsec.

Besides, picture signals were calculated for the case of the high-vision system 1035$i$ (1035 pixels in the vertical direction, and 1920 pixels in the horizontal direction) with a scanning efficiency of 70% and frame frequencies of 60 Hz and 72 Hz.

Figure 9A:
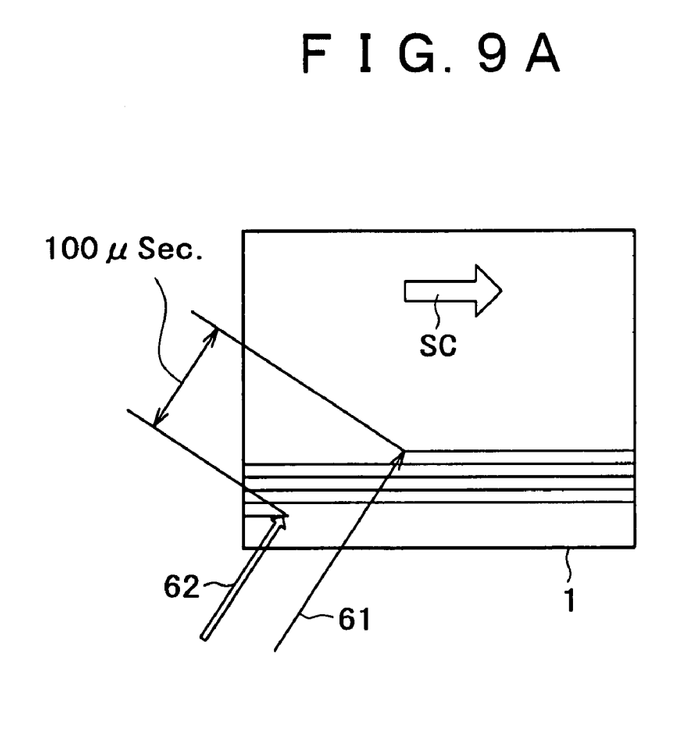
FIGS. 9A and 9B are diagrams showing the difference due to the scanning system, in the projection type image display apparatus according to the present invention.

FIG. 9A shows the case where the present invention is applied to a horizontal/vertical scanning system used generally for a conventional image display apparatus.

In the horizontal/vertical scanning system, an image is displayed by scanning a screen 1 with an image display laser beam 61 in the horizontal direction and the vertical direction, as shown in FIG. 9A.

In the case of the above-mentioned image signal, when the detection position (irradiation position of a distance measuring laser beam 62) precedes by 100 μsec, the precedence is by 8547 pixels where the frame frequency is 60 Hz and by 10204 pixels where the frame frequency is 72 Hz. When the precedence is by this number of pixels, about five turn-backs of horizontal scan occur, so that the detection position does not always precede, as viewed in a scan direction SC. FIG. 9A shows the condition where the detection position does not precedes in the scan direction SC.

In this condition, the precedent detection is difficult to achieve, and particularly where an intruding object moves (particularly where a vertical movement of the component is present), the image display laser beam 61 not lowered in output may collide against the intruding object.

Figure 9B:
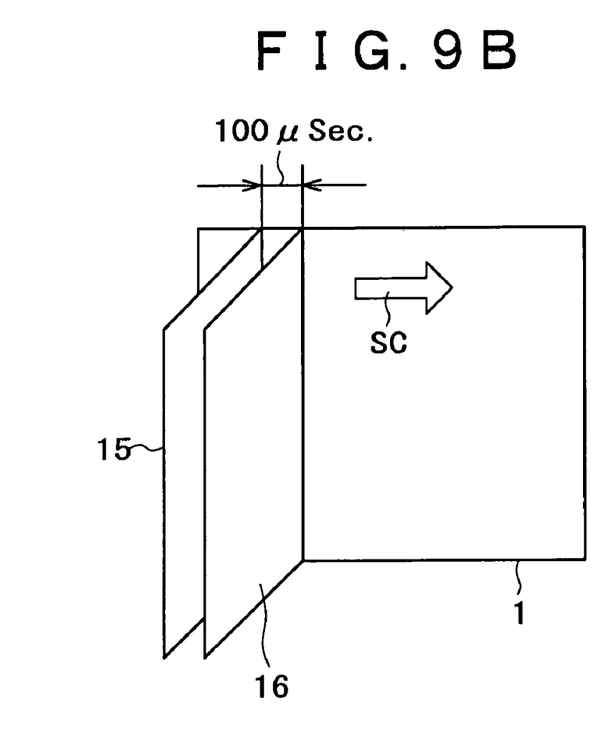

FIG. 9B shows the case of a horizontal scanning system adopted in the above-described embodiment.

In the horizontal scanning system, in the case of the above-mentioned image signal, when the detection position (irradiation position of a distance measuring laser beam 16) precedes by 100 μsec, the precedence may be by 16 pixels where the frame frequency is 60 Hz and by 20 pixels where the frame frequency is 72 Hz.

That is to say, precedent detection by about 20 pixels may be adopted in the horizontal scanning system, and, for this purpose, an overscanning by about 20 pixels may be conducted at both side ends in the horizontal direction.

In this case, the detection position always precedes in the scan direction SC, and the spacing may be about 20 pixels, so that the intruding object can be detected easily and securely.

Incidentally, the irradiation position of the image display laser beam 15 is located in the exterior of the image display region when the detection position is located at a scan starting end portion of the image display region. It is desirable to stop the image signal for the image display laser beam 15 until the irradiation position of the image display laser beam 15 enters the image display region. On the other hand, when the irradiation position of the image display laser beam 15 is located at a scan finishing end portion of the image display region, the detection position is located in the exterior of the image display region, and detection with the distance measuring laser beam 16 may be stopped.

As has been described above, considering the processing speed of a detection circuit at present, the present invention can be easily applied to the horizontal scanning system. In addition, when the processing speed of the detection circuit is enhanced by a factor of about 10 by the future progress of semiconductor technology, the precedent detection is possible and the present invention is applicable, even in the horizontal/vertical scanning system.

Besides, concerning a projection type image display apparatus in which the output of the image display laser beam is lowered upon detection of an intruding object, a conventionally contemplated configuration and the configuration according to the present invention will be compared with each other.

Figure 10A:
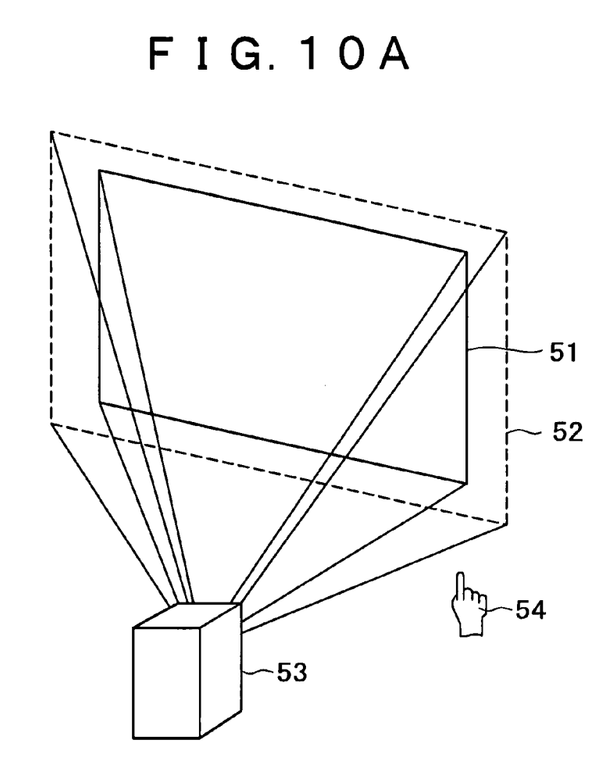
FIGS. 10A and 10B are diagrams for illustrating the configuration of the present invention and the configuration of the related art in a comparative manner.

In the conventionally contemplated configuration, as shown in FIG. 10A, a monitor region 52 is set broad to include the image display region 51 and the surrounding part of the screen, and the output of a laser beam is lowered when an intruding object is found.

In this configuration, when the intruding object is present in the monitor region 52, the screen surface as a whole is darkened. Also where the intruding object 54 is present not in the image display region 51 but only in the surrounding part, the screen surface as a whole is darkened.

Figure 10B:
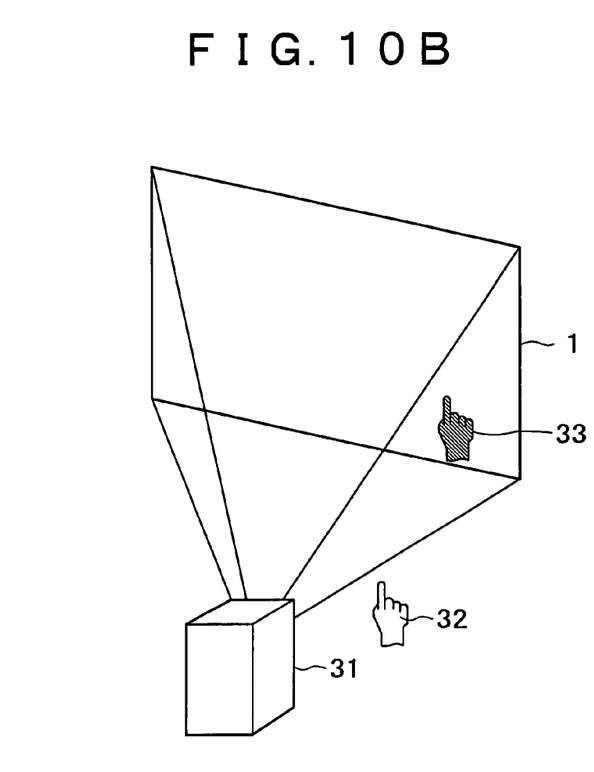

On the other hand, in the configuration of the present invention, the detection is conducted at the detection position preceding the image display laser beam. Accordingly, the output of the laser beam is lowered, for example, where an intruding object is present. Further, by using for example a one-dimensional CCD image pickup device as the detector 17, the laser beam output is lowered only where the intruding object 32 is present in the region space ranging from the laser projector (projection type image display apparatus) 31 to the screen (image display region) 1, as shown in FIG. 10B, and the part corresponding to the intruding object 32 is only seen as, for example, a shadow 33 on the screen 1, and the image as a whole is not disturbed.

Figure 11:
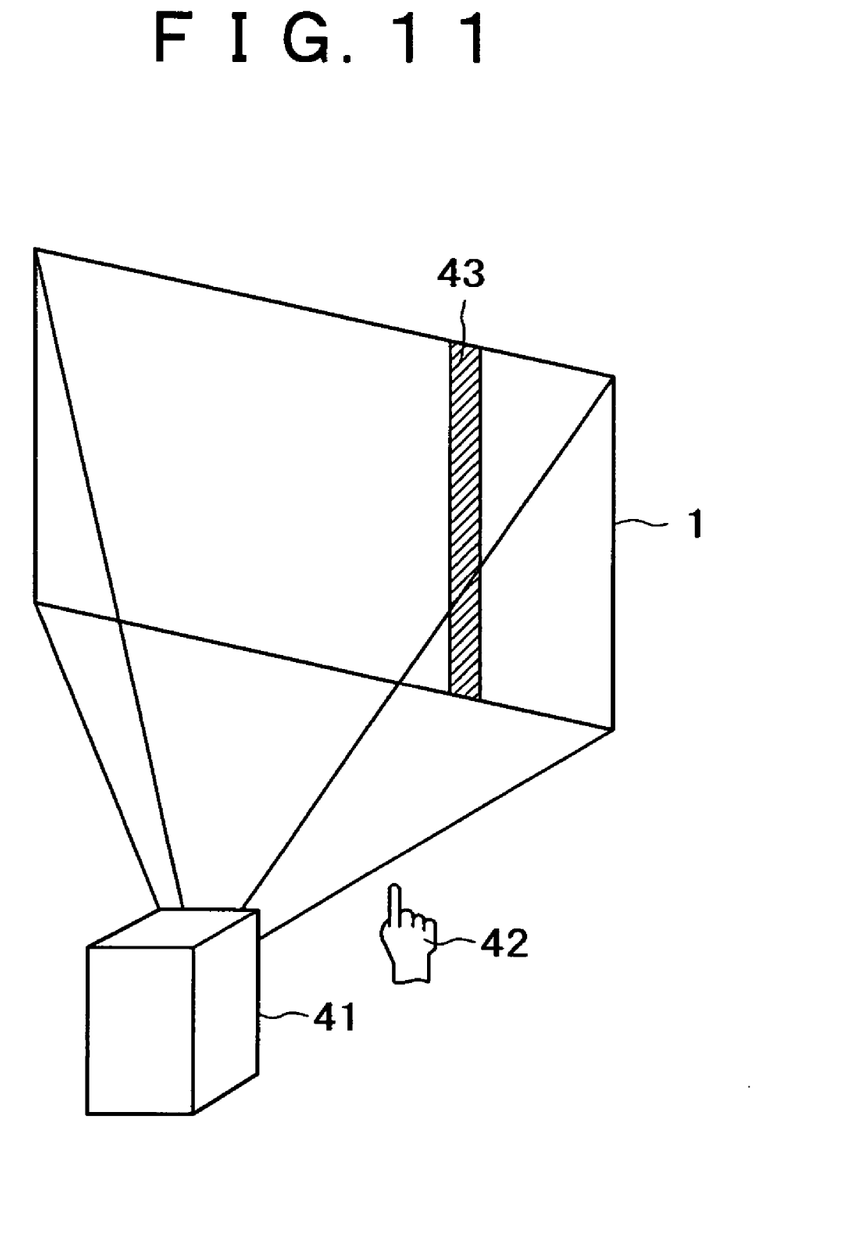
FIG. 11 is a diagram showing a still further embodiment in which the output of a laser beam is lowered according to the present invention.

Alternatively, as shown in FIG. 11, the laser beam output is lowered only where the intruding object 42 is present in the region space ranging from the laser projector (projection type image display apparatus) 41 to the screen (image display region) 1, and the part corresponding to the intruding object 42 is only seen as, for example, a thin belt 43 on the screen 1, and the image as a whole is not disturbed.

Incidentally, in the above-described embodiments, the infrared laser beam 16 which is projected from the projection type image display apparatus is used as the distance measuring laser beam. The infrared laser beam 16 is vertically elongate and has such an output level as to be safe to the eyes. The reflected beam is received and detected by the detector 17, the reflection distance is calculated, and the presence or absence of an intruding object is determined. However, the method of detection and the configuration of the detection means may be configured in other ways.

For example, a configuration may be considered in which a vertically elongate reflected beam of infrared laser beam is condensed by a semi-cylindrical lens, and the presence or absence of an object is determined from the variation of the integrated value of the reflected beam. In this case, the position in the vertical direction (vertical direction of the screen surface of the screen 1) is not found, so that the part where the intruding object has been present is displayed as a thin belt 43 shown in FIG. 11.

In addition, in the projection type image display apparatuses 10 and 30 in the above-described embodiments, the scanning mirror 13 and the projection lens 14 are used in common for the image display laser beam 15 and the preceding infrared laser beam 16. However, it is also possible to individually provide a scanning mirror and a projection lens for the infrared laser beam 16, as contrasted to these configurations in the embodiments.

In other words, in the present invention, both the configuration in which the optical component parts for projecting onto the screen are used in common for the image display laser beam and the detection means for precedent detection and the configuration in which the optical component parts are individually provided are possible.

Besides, while infrared rays are used as the detection beam of the detection means in the above-described embodiments, other rays than the infrared rays can be used, provided that they are invisible to the human eyes and they do not influence the images displayed and do not generate other problems.

The present invention is not limited to the above-described embodiments, and various configurations can be adopted within the scope of the gist of the invention.

What is claimed is:

1. A projection type image display apparatus comprising:
projection means for projecting an image on an image-displaying screen by scanning with a laser beam, and
detection means for detecting with a detection beam the presence or absence of an intruding object between said projection means and said screen, wherein detection by the detection means is conducted relative to a position preceding said laser beam in the scan direction of said laser beam,
wherein in said projection means, said scanning with said laser beam is conducted by a mirror surface turned around an axis, and said detection beam is radiated onto said mirror surface at an angle different from the incidence angle of said laser beam onto said mirror surface.

2. The projection type image display apparatus as set forth in claim 1, wherein said detection means radiates said detection beam invisible to the human eyes and receives and detects said reflected detection beam to thereby detect the presence or absence of said intruding object.

3. The projection type image display apparatus as set forth in claim 1, wherein said detection means is capable of measuring the distance to said intruding object by said detection beam.

4. The projection type image display apparatus as set forth in claim 1, wherein said laser beam is projected from said projection means onto said screen in the state of a laser beam modulated in one-dimensional direction, and said scanning is conducted in a direction substantially orthogonal to the longitudinal direction of said beam.

5. The projection type image display apparatus as set forth in claim 1, wherein said detection means has a part of an image display region of said screen as a detection region.

6. The projection type image display apparatus as set forth in claim 1, wherein said detection means has a region in the exterior of an image display region of said screen as a detection region.

7. The projection type image display apparatus as set forth in claim 2, wherein the irradiation with said detection beam is conducted by said projection means.

8. The projection type image display apparatus as set forth in claim 2, wherein said detection means comprises a beam detecting portion for receiving and detecting said detection beam, and said beam detecting portion is comprised of a one-dimensional image pickup device.

9. A projection type image display apparatus comprising:
projection means for projecting an image on an image-displaying screen by scanning with a laser beam, and
detection means for detecting with a detection beam while scanning with said laser beam the presence or absence of an intruding object between said projection means and said screen, wherein detection by the detection means is conducted relative to a position preceding said laser beam in the scan direction of said laser beam, and
wherein said laser beam is projected from said projection means onto said screen in the state of a laser beam modulated in one-dimensional direction, and said scanning is conducted in a direction substantially orthogonal to the longitudinal direction of said laser beam.

10. The projection type image display apparatus as set forth in claim 9, wherein said detection means radiates a detection beam invisible to the human eyes and receives and detects said reflected detection beam to thereby detect the presence or absence of said intruding object.

11. The projection type image display apparatus as set forth in claim 9, wherein said detection means is capable of measuring the distance to said intruding object by said detection beam.

12. The projection type image display apparatus as set forth in claim 9, wherein in said projection means, said scanning with said laser beam is conducted by a mirror surface turned around an axis, and said detection beam is radiated onto said mirror surface at an angle different from the incidence angle of said laser beam onto said mirror surface.

13. The projection type image display apparatus as set forth in claim 9, wherein said detection means has a part of an image display region of said screen as a detection region.

14. The projection type image display apparatus as set forth in claim 9, wherein said detection means has a region in the exterior of an image display region of said screen as a detection region.

15. The projection type image display apparatus as set forth in claim 10, wherein the irradiation with said detection beam is conducted by said projection means.

16. The projection type image display apparatus as set forth in claim 10, wherein said detection means comprises a beam detecting portion for receiving and detecting said detection beam, and said beam detecting portion is comprised of a one-dimensional image pickup device.

17. The projection type image display apparatus as set forth in claim 10, wherein said detection means comprises a beam detecting portion for receiving and detecting said detection beam, and said beam detecting portion is comprised of a one-dimensional image pickup device.

* * * * *